UNITED STATES PATENT OFFICE.

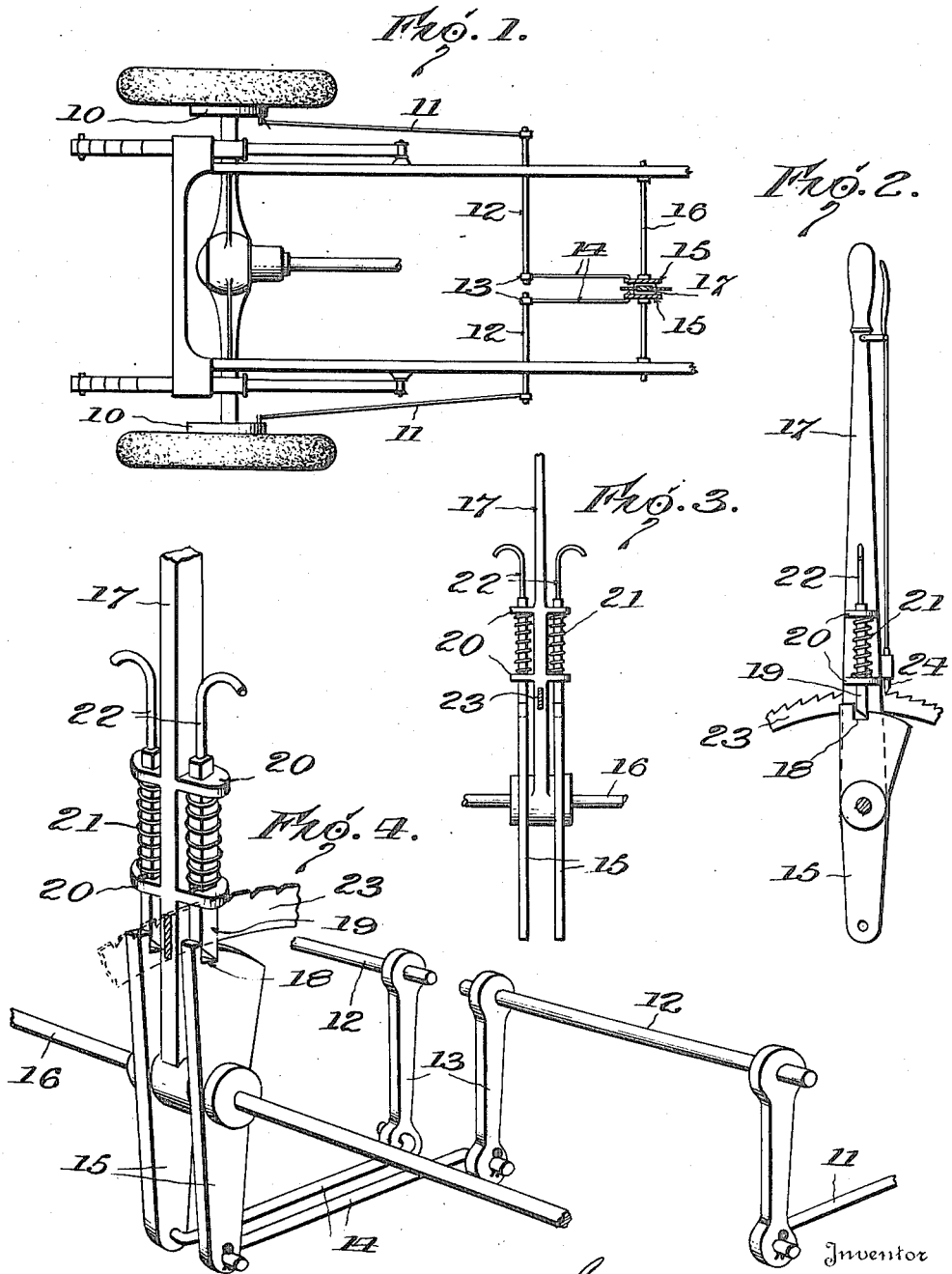

GEORGE L. WISER, OF ELKHART, INDIANA.

BRAKE MECHANISM.

1,224,826.   Specification of Letters Patent.   Patented May 1, 1917.

Application filed November 18, 1916. Serial No. 132,198.

*To all whom it may concern:*

Be it known that I, GEORGE L. WISER, a citizen of the United States, residing at Elkhart, in the county of Elkhart and State of Indiana, have invented certain new and useful Improvements in Brake Mechanism, and do hereby declare that the following is a full, clear, and exact description of the same, reference being had to the annexed drawings, making a part of this specification, and to the letters and figures of reference marked thereon.

My invention relates to motor vehicles having differential gear on the driving axle, and the object of my invention, generally stated, is to provide a brake mechanism which will enable the braking of either drive wheel independently of the other when occasion arises, as for example, when it is desired to make a short turn, and when the conditions of traction are such that one wheel is without effective contact with the ground and runs, or spins idly, and for the attainment of such object my invention consists in the brake mechanism having the construction hereinafter specified and claimed.

In the accompanying drawings—

Figure 1 is a top plan view of enough of the frame and running gear of an automobile as serves to illustrate my invention;

Fig. 2 is a detail view in side elevation of the operating devices, including and associated with the hand lever;

Fig. 3 is an end elevation thereof.

Fig. 4 is a perspective view of the mechanism detached from the car.

Each of the driving wheels, has as usual its own friction band brake 10, and each band brake is connected by a forwardly extending rod 11 to a crank arm on a transversely extending brake shaft 12, the two brake shafts extending in alinement with each other and each capable of being rocked independently of the other so that at will either brake may be applied to stop its wheel independently of the other. At its inner end each of said brake shafts has a crank arm 13, from which forwardly extends a brake rod 14 that is pivotally connected to the lower end of a lever or crank 15 mounted to rock upon the cross shaft 16. There are thus two such levers 15, and situated between them and mounted on the cross shaft 16 is an upwardly extending hand lever 17. It will be seen that by connecting said hand lever with but one of the levers 15 at a time only one brake will be applied, and by connecting it with both of said levers 15, which is its normal condition, both brakes may be simultaneously applied. For achieving this result, each of the levers 15, has in its end above the cross shaft 16, a notch 18, into which is adapted to enter the lower end of a latch bolt 19 slidable in guide lugs 20 on the adjacent side of the hand lever. Said latch bolt is normally pressed by a coil spring 21 to throw its lower end into the lever notch, and it is provided with a hook-form handle 22 for lifting it to disengage it from its lever notch. When a latch rod is lifted to disengage it from its lever notch, and the operating lever 17 is moved far enough in the direction to apply the brake to take the latch out of alinement with its notch, then the hand may be removed from the latch in the further movement of the operating lever to apply the opposite brake which still remains connected with the operating lever. The bottom end of the latch, or the top surface of the lever 15, over which it moves, or both may be beveled, as is shown, so that upon the return movement of the operating lever the latch will readily pass over the upper end of its lever 15 and drop into the notch. It will thus be seen that automatically and without any attention whatever on the part of the operator, upon the completion of the movement of the operating lever to release the brake that is in operating condition, the unlatched, or disengaged brake will be connected with the operating lever, and, hence, the brake mechanism will be placed in a state, or condition for the application of both brakes, as under the usual, or normal conditions of operating the car. Accordingly there is no danger by reason of forgetfulness, or inattention, after having made use of but one brake, of leaving the mechanism in the dangerous condition that it would be in if but one brake should be effective.

My invention, as will be apparent, is embodied in mechanism that is exceedingly simple of construction and manipulation, and which eliminates the existence of a dangerous condition, and is especially applicable to cars of the center control type.

The operating lever may be locked in brake-applying position by the employment of the usual ratchet segment 23 and dog, or pawl 24, mounted on the operating lever.

I do not limit myself to any such details of construction as the precise forms, or shapes of the parts, nor to special devices for connecting the lever mechanism with the brake.

Having thus described my invention what I claim is—

1. The combination of a vehicle having a differential drive, and brakes for the respective traction wheels, independent operating members for the respective brakes, a single operating lever, and a separate manually releasable latch that normally connects each operating member with said brake-operating member, said latch normally connecting its brake-operating member with said operating lever and automatically so connecting them when free to act.

2. The combination of a vehicle having a differential drive, and brakes for the respective traction wheels, independent operating members for the respective brakes, a single operating lever, and independently releasable devices normally connecting the operating lever with said brake operating members, and consisting of a latch bolt for each of said members mounted on said operating lever.

3. The combination of a vehicle having a differential drive, and brakes for the respective traction wheels, separate brake levers for the respective brakes, an operating lever, and independently operable latch bolts for the respective brake levers.

In testimony whereof I affix my signature in presence of two witnesses.

GEORGE L. WISER.

Witnesses:
W. H. CHESTER,
R. F. MARSHALL.